United States Patent
Kojima et al.

(10) Patent No.: US 9,812,997 B2
(45) Date of Patent: Nov. 7, 2017

(54) OPENING CONTROL DEVICE IN A VEHICLE DOOR

(71) Applicant: MITSUI KINZOKU ACT CORPORATION, Yokohama-shi (JP)

(72) Inventors: Ayahito Kojima, Kawasaki (JP); Yasuyuki Watanabe, Yokohama (JP); Kazuhito Yokomori, Yokohama (JP)

(73) Assignee: Mitsui Kinzoku Act Corporation (JP)

( * ) Notice: Subject to any disclaimer, the term of this patent is extended or adjusted under 35 U.S.C. 154(b) by 127 days.

(21) Appl. No.: 14/507,155

(22) Filed: Oct. 6, 2014

(65) Prior Publication Data

US 2015/0096233 A1    Apr. 9, 2015

(30) Foreign Application Priority Data

Oct. 8, 2013 (JP) ................................. 2013-210962

(51) Int. Cl.
  *H02P 3/14*    (2006.01)
  *E05F 15/40*   (2015.01)
  *E05F 15/70*   (2015.01)
  *H02P 3/12*    (2006.01)

(52) U.S. Cl.
  CPC ................ *H02P 3/14* (2013.01); *E05F 15/40* (2015.01); *E05F 15/70* (2015.01); *H02P 3/12* (2013.01); *E05Y 2201/21* (2013.01); *E05Y 2201/424* (2013.01); *E05Y 2400/302* (2013.01); *E05Y 2800/74* (2013.01); *E05Y 2900/546* (2013.01)

(58) Field of Classification Search
  CPC .................................. B60G 11/27; B60R 16/03
  See application file for complete search history.

(56) References Cited

U.S. PATENT DOCUMENTS

| | | | | |
|---|---|---|---|---|
| 5,938,252 A | * | 8/1999 | Uemura | E05B 81/14 292/201 |
| 6,293,050 B1 | * | 9/2001 | Johnk | E05F 1/1091 49/276 |
| 6,755,458 B1 | * | 6/2004 | Oberheide | E05F 1/1091 296/146.8 |
| 2001/0024093 A1 | * | 9/2001 | Naganuma | H02H 7/0851 318/445 |
| 2006/0181108 A1 | * | 8/2006 | Cleland | E05F 15/63 296/146.4 |
| 2013/0024076 A1 | * | 1/2013 | Fukui | E05F 15/622 701/49 |

FOREIGN PATENT DOCUMENTS

| | | |
|---|---|---|
| JP | 2001-132327 A | 5/2001 |
| JP | 2005-82019 A  | 3/2005 |

* cited by examiner

*Primary Examiner* — Eduardo Colon Santana
*Assistant Examiner* — Charles S Laughlin
(74) *Attorney, Agent, or Firm* — Skinner and Associates; Joel Skinner

(57) ABSTRACT

In an opening control device in a vehicle door, in order to stop the door at a desired position, a control unit stops power supply to a motor, and a short circuit is made in an electric circuit between a first terminal and a second terminal of the motor. In the electric circuit, there is formed a regenerative brake circuit in which regenerative braking can be applied to rotation of the motor. When the door is positioned within a fully-open-position-adjacent range that is adjacent to a fully-open position of the door, regenerative braking is applied to normal rotation of the motor for opening the door and is not applied to reverse rotation of the motor for closing the door.

6 Claims, 7 Drawing Sheets

[ ELECTRICALLY OPENING ]

[ ELECTRICALLY CLOSING ]

[ WHEN DOOR IS WITHIN FULLY-CLOSED-POSITION-ADJACENT OPEN RANGE R1 ]

[ WHEN DOOR IS WITHIN FULLY-OPEN-POSITION-ADJACENT OPEN RANGE R2 ]

[ WHEN DOOR IS WITHIN INTERMEDIATE OPEN RANGE R3 ]

OPENING CONTROL DEVICE IN A VEHICLE DOOR

BACKGROUND OF THE INVENTION

The present invention relates to an opening control device in a vehicle door in which the door in a vehicle body is electrically opened and closed.

In an opening control device in a vehicle door, a liftgate on the back of the vehicle and a sliding door on the side can be opened and closed not only electrically but also manually by weak force in JP2005-82019A and JP2001-132327A.

In JP2005-82019A, in an opening control device in a liftgate, when the liftgate is opened to a fully-open position electrically, it is likely to hit the ceiling of a car park depending on parking space of the car park. In spite of trying to stop the liftgate right before the fully-open position, particularly, in the liftgate that vertically opens and closes, a force for opening the liftgate is applied by a gas stay to reduce an opening force. The liftgate is lifted by the gas stay to the fully-open position and finally hits the ceiling of the car park. It is required to provide technique in which a liftgate can be stopped right before the fully-open position.

In JP2001-132327A, a clutch mechanism is provided on a power-transmitting path between a motor and a door. When the door is between the fully-closed position and the fully-open position, the clutch mechanism is in half-clutch state and the door is held in the intermediate position. The door can be opened and closed manually to meet the conditions above. However, it is required to provide a control circuit for controlling the clutch mechanism in the half-clutch state. Thus, its structure becomes more complicated, which results in increase in power consumption and costs.

SUMMARY OF THE INVENTION

In view of the foregoing disadvantages, it is an object of the invention to provide an opening control device in a vehicle door in which the door can be stopped right before a fully-open position.

DETAILED DESCRIPTION OF PREFERRED EMBODIMENT

An embodiment of the present invention will be described with respect to the drawings.

Figure 1:
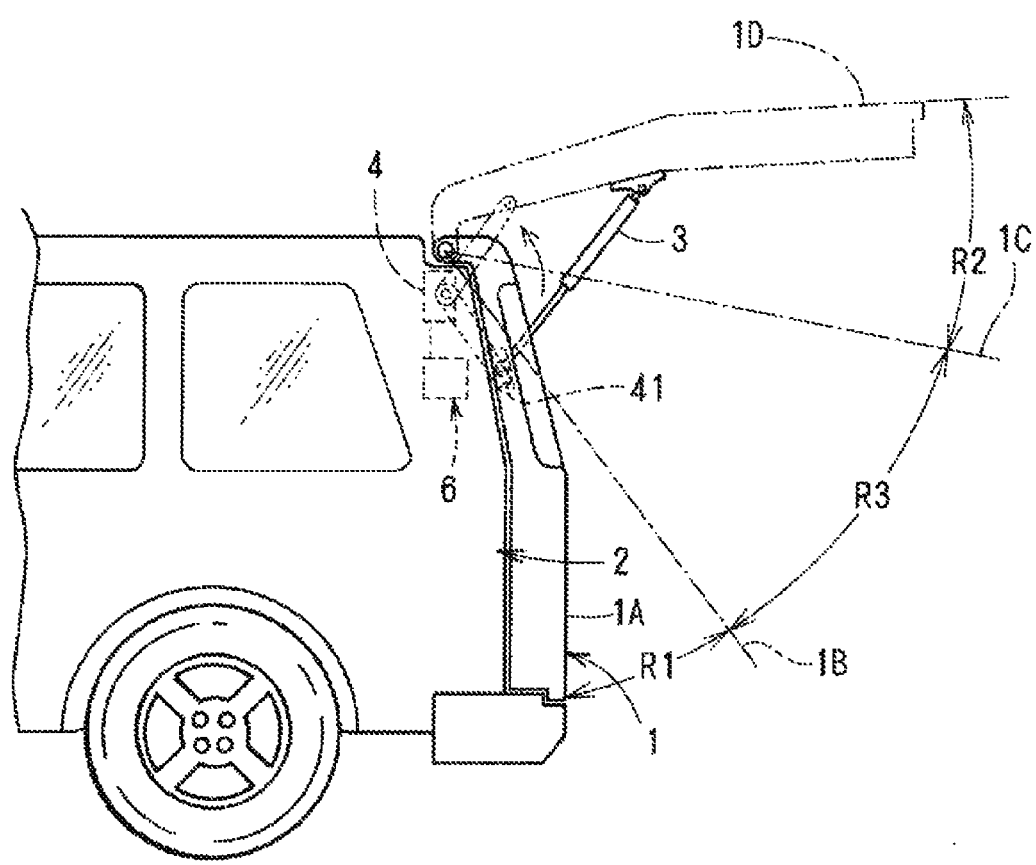
FIG. 1 is a side elevational view of rear part of a vehicle comprising an embodiment of an opening control device according to the present invention.

FIG. 1 is a side elevational view of a rear part of a vehicle comprising a liftgate that pivots with a hinge (not shown) comprising transverse hinge shaft at the upper edge to open and close a window at about 90 degrees.

In FIG. 1, numeral 2 denotes a vehicle body; 3 denotes a gas stay that is retractile between the liftgate 1 and the vehicle body 3 to open the liftgate 1; 4 denotes an electric drive disposed on the inner side of the rear part of the vehicle body; and 6 denotes a control unit for the motor 5.

The gas stay 3 exerts a force for opening the door 1 to assist a door-opening force and is pivotally mounted at one end to the vehicle body 2 and at the other end to the door 1.

In FIG. 1, a fully-closed-position-adjacent open range R1 is defined between a fully-closed position shown by a solid line and a first open position 1B which is open at a first predetermined angle from the fully-closed position. A fully-open-position-adjacent open range R2 is defined between a fully-open position 1D and a second open position 1C which is more open than the first open position 1B. An intermediate open range R2 is defined between the first open position 1B and the second open position 1C. A force for opening the door 1 by the gas stay 3 has a relation of the fully-open-position-adjacent range R2>the intermediate open range R3>the fully-open-position-adjacent open range R1 due to positional relationship of a support point for the gas stay 3. The gas stay 3 is set as a force for raising the door 1 to the fully-open position 1D when the door 1 is within the fully-open-position-adjacent range R2; as a force that balances a force for closing the door 1 by its own weight when the door 1 is within the intermediate open range R3; and as a force for closing the door 1 by its own weight when the door 1 is within the fully-closed-position-adjacent open range R1.

In view of change in gas pressure depending on circumstantial temperature for creating a force of the gas stay 3, this embodiment comprises the structure for changing the fully-closed-position-adjacent open range R1 and the fully-open-position-adjacent open range R2 to the range suitable for surrounding temperature, and will be described later.

In the fully-closed position 1A of the door 1 shown by a solid line in FIG. 1, a door latch device (not shown) in the door 1 engages with a striker (not shown) of a vehicle body 2. The first open position 1B is inclined from the fully-closed position at the first angle (about 20 degrees in this embodiment); the second open position 1C is inclined from the fully-closed position at the second angle (about 60 degrees in this embodiment); and the fully-open position 1D is inclined from the fully-closed position at about 90 degrees and prevented from opening further. In this embodiment, at room temperature, in the fully-closed-position-adjacent range R1, the open angle is set from 0 to less than 20 degrees, and in the fully-open-position-adjacent range R2, the open angle is set from 60 degrees to 90 degrees.

The electric drive 4 comprises a reversible motor 5 and a reduction mechanism (not shown) for stepping down rotation speed of the motor 5. The liftgate 1 is connected to an output portion of the reduction mechanism via a connecting rod 41. Thus, a control control switch 16 for electrically opening and closing the liftgate 1, such as a switch close to a driver's seat, a remote control key switch or a switch on the liftgate 1, power is supplied from the battery 7 of the vehicle body, and the motor 5 normally rotates to open the liftgate and reversely rotates to close the liftgate. The rotation is transmitted to the liftgate 1 via the reduction mechanism and connecting rod and the liftgate 1 is actuated to open or close. The electric drive 4 does not comprise a clutch mechanism such as an electromagnetic clutch for disconnecting a power-transmitting path for allowing rotation of the motor 5 to be transmitted to the liftgate 1, but comprises the structure for enabling the liftgate 1 to open and close manually. When power is not supplied to the motor 5 without actuating the control control switch 16, the liftgate 1 is manually opened to allow the motor 5 to rotate normally and is closed to allow the motor 5 to rotate reversely.

At a rotating part of the motor 5 or the reduction mechanism of the electric drive 4, there is provided a rotary sensor 8 such as a rotary encoder as door-motion detecting means for detecting rotation speed. A pulse signal supplied from the rotary sensor is transmitted to a control circuit of the control unit 6.

The control circuit of the control unit 6 comprises an Integral one-chip CPU of ROM storing a control program with RAM as a working area of CPU. A series of control processes are carried out by a control program stored in ROM. By counting a pulse signal from the rotary sensor 3, a present position of the liftgate 1 is determined. With the position of the liftgate 1, switches 9, 11, 12, 13 (later described) are turned on and off based on the measured position of the liftgate 1. Furthermore, a predetermined operation such as stopping after opening the control control switch 16 is carried out in the control unit 6. Thus, an opening-stop position just before the fully-open position 1D in the fully-open-position-adjacent open range R2 can be set at an optional position suitable for user's taste. The control unit 6 has a memory that can store the predetermined open-stop position and provides function for stopping power supply to the motor 5 to stop the liftgate 1 at the predetermined opening-stop position when the liftgate 1 opens by normal rotation of the motor 5 and reaches the opening-stop position determined by the user. The rotary sensor 8 may be a rotary encoder for generating two two-phase pulse signals that differ from each other at 90 degrees in phase in order to detect a distance and a direction of motion of the liftgate 1.

Values defected by a temperature sensor 17, a tilt sensor 18, an air-pressure sensor or a solar radiation sensor as vehicle-condition detecting means in the vehicle body 2 are fed into the control circuit of the control unit 6. The control circuit operates the range change process for changing the fully-closed-position-adjacent range R1 or the fully-open-position-adjacent range R2 to the range suitable to circumferential temperature and parking-road-surface angle by operating them based on the detected values. The vehicle-condition detecting means is not limited to the temperature sensor 17, tilt sensor 18, air-pressure sensor and solar radiation sensor, but may include ah means for detecting the conditions that affect gas pressure of the gas stay 3 and force for opening the door 1.

When the temperature sensor 17 detects temperature higher than a predetermined temperature in which gas pressure of the gas stay 5 becomes high pressure to increase an opening force to the liftgate 1 or a lift force, and when the vehicle tilt sensor 18 detects an angle more than a predetermined forward-rising angle, the control circuit carries out a range-change process for increasing the fully-open-position-adjacent range R2 in a closing direction based on detected value of the temperature sensor 17 and vehicle tilt sensor 18. When the temperature sensor 17 detects temperature lower than a predetermined temperature in which gas pressure of the gas stay 3 becomes lower to reduce an opening force or a lifting force that exerts the liftgate 1 and the vehicle tilt sensor 18 detects an angle greater than a predetermined vehicle-forward-lowering tilt angle, the control circuit carries out a range-change process for increasing the fully-closed-position-adjacent open range R1 in an opening direction based on detected value of the temperature sensor and vehicle tilt sensor 18.

The motor 5 is a DC motor with a brush and normally rotates or reversely rotates depending on a direction of a supplied electric current. When the motor normally rotates, the liftgate 1 is opened, and when the motor rotates reversely, the liftgate 1 is closed.

FIGS. 2-7 illustrate one example of a drive circuit for the motor 5 in the control unit 6. In order that the switches 9, 11, 12, 13 of the drive circuit are turned on/off by the control circuit of the control unit 6, they are connected with electric wires which are not illustrated to simplify the drawings.

The drive circuit of the control unit 6 comprises the on/off switch 9 that comprises a mechanical relay that is electrically connected to the battery 7; a current-detecting shunt resistor 10 for detecting an electric current in the circuit; the opening switch 11 that comprises a mechanical relay connected in series to an electric circuit between the current-detecting shunt resistor 10 and a positive supply terminal 5a of the motor 5; the closing switch 12 that comprises a mechanical relay connected in series to an electric circuit between the current-defecting shunt resistor 10 and a negative supply terminal 5b of the motor 5; the on/off switch 13 connected in series to an electric circuit between the opening switch 11 and the positive supply terminal 5a of the motor 5; a driving switch 14 that comprises FET (Field Effect Transistor); and a diode 15 connected in series to the opening switch 11 and the closing switch 12 to allow conduction only in a single direction or in a forward direction.

The on/off switch 9 is "off" when the control control switch 16 does not operate, and when the control control switch 16 is operated to open or close the liftgate 1, the switch 9 becomes "on" to enable the battery 7 to supply power to the drive circuit.

In case that power is not supplied to the drive circuit, when the control unit 6 detects the fully-closed position 1A of the liftgate 1, the opening switch 11 is in default where a moving contact point 11a is electrically connected to an A contact point 11b; when it is detected that the liftgate 1 is in the fully-closed-position-adjacent open range R1, the opening switch 11 is in a turning state where the moving contact point 11a is electrically connected to a B contact point 11c; and when it is detected that the liftgate 1 is in the fully-open-position-adjacent open range R2 and the intermediate open range R3, the opening switch is in default. When the control control switch 16 operates to open the liftgate 1 to enable power to be supplied to the drive circuit, the opening switch 11 is in the turning state, and when the control control switch 16 operates to close the liftgate 1 to enable power to be supplied to the drive circuit, the opening switch 11 is in default.

In case that power is not supplied to the drive circuit, when the control unit 6 defects the fully-closed position 1A of the liftgate 1, the closing switch 12 is in default where a moving contact point 12a is electrically connected to a B contact point 12c; when it is detected that the liftgate 1 is in the fully-closed-position-adjacent open range, the closing switch 12 is in a turning state where the moving contact point 12a is electrically connected to an A contact point; and when it is detected that the liftgate 1 is in the fully-open-position-adjacent open range R2 and the intermediate open range R3, the closing switch 12 is in default. When the control switch 16 operates to open the liftgate 1 to enable power to be supplied to the drive circuit, the closing switch 12 is in the turning state, and when the control switch 16 operates to close the liftgate 1, the closing switch 12 is in default.

In case that power is not supplied to the drive circuit, when the liftgate 1 is on the fully-closed position and within the intermediate open range R3, the on/off switch is "off" where an electric circuit turns off between the opening switch 11 and the positive supply terminal 5a of the motor 5 to open the regenerative brake circuit later described. When the control switch 16 operates to open/close the liftgate 1 or when the liftgate 1 is within the fully-closed-position-adjacent range R1 or the fully-open-position-adjacent range R2, the on/off switch 13 turns on to enable the opening switch 11 to be connected to the motor 5 electrically and to enable the regenerative brake circuit to be closed.

The driving switch 14 is controlled in PWM (Pulse Width Modulation) by the control circuit thereby controlling rotation speed of the motor 5 or opening speed of the liftgate 1 to become an aiming speed.

Turning control in each state of the drive circuit in the control unit will be described.

Figure 2:
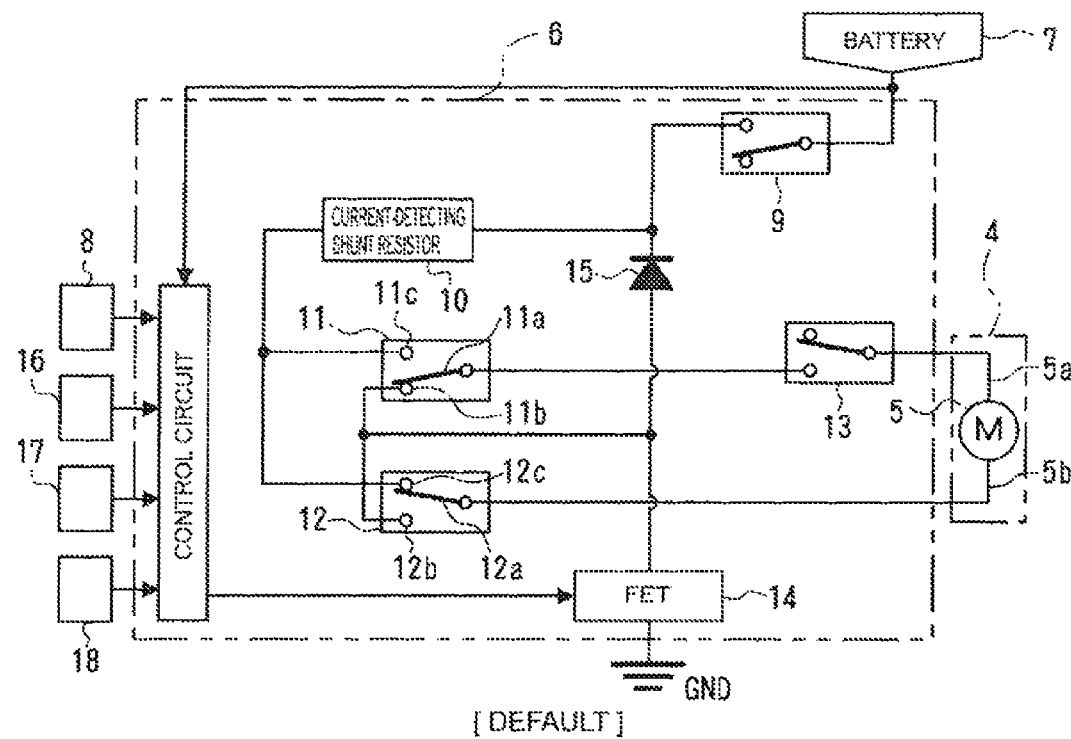
FIG. 2 is a circuit diagram of the control device in default.

When the liftgate 1A is on the fully-closed position, each of the switches 9, 11, 12, 13 is in default in FIG. 2. Each of the fully-closed-position-adjacent open range R1 and the fully-open-position-adjacent open range R2 is changed by the control unit 6 based on detected values of the temperature sensor 17 and the tilt sensor 18, By the change, the fully-closed-position-adjacent open range R1 and the fully-open-position-adjacent open range R2 are enlarged thereby decreasing the intermediate open rage R3 naturally.

Figure 3:
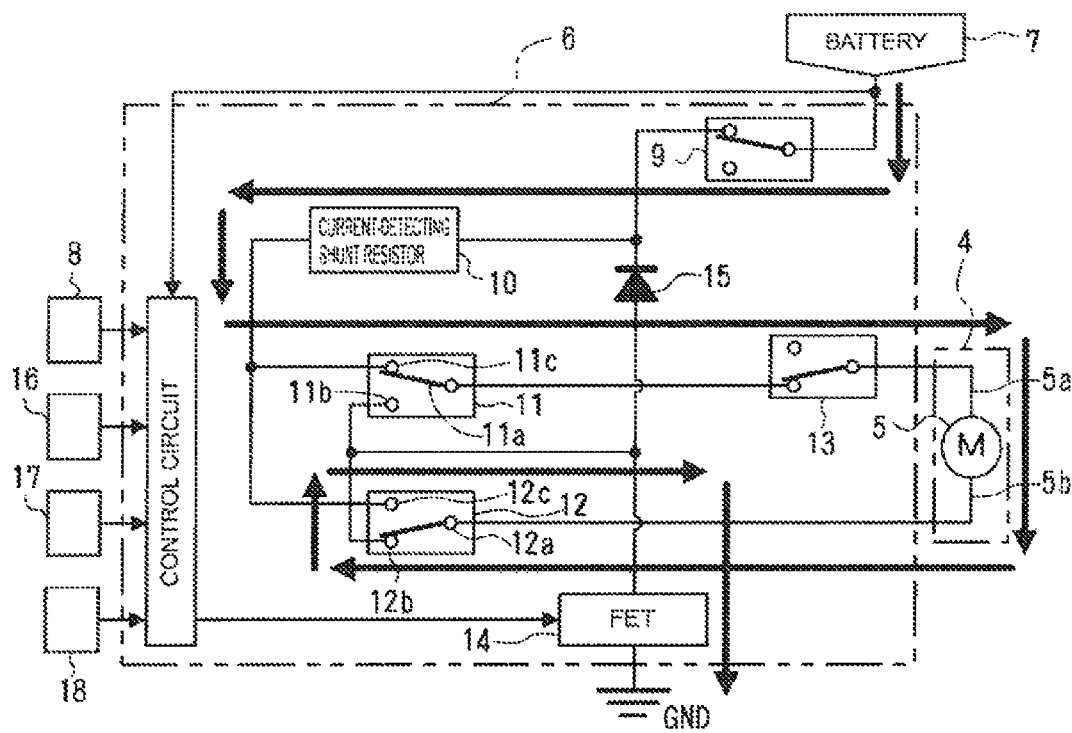
FIG. 3 is a circuit diagram of the control device in electrically-opening operation.
Figure 4:
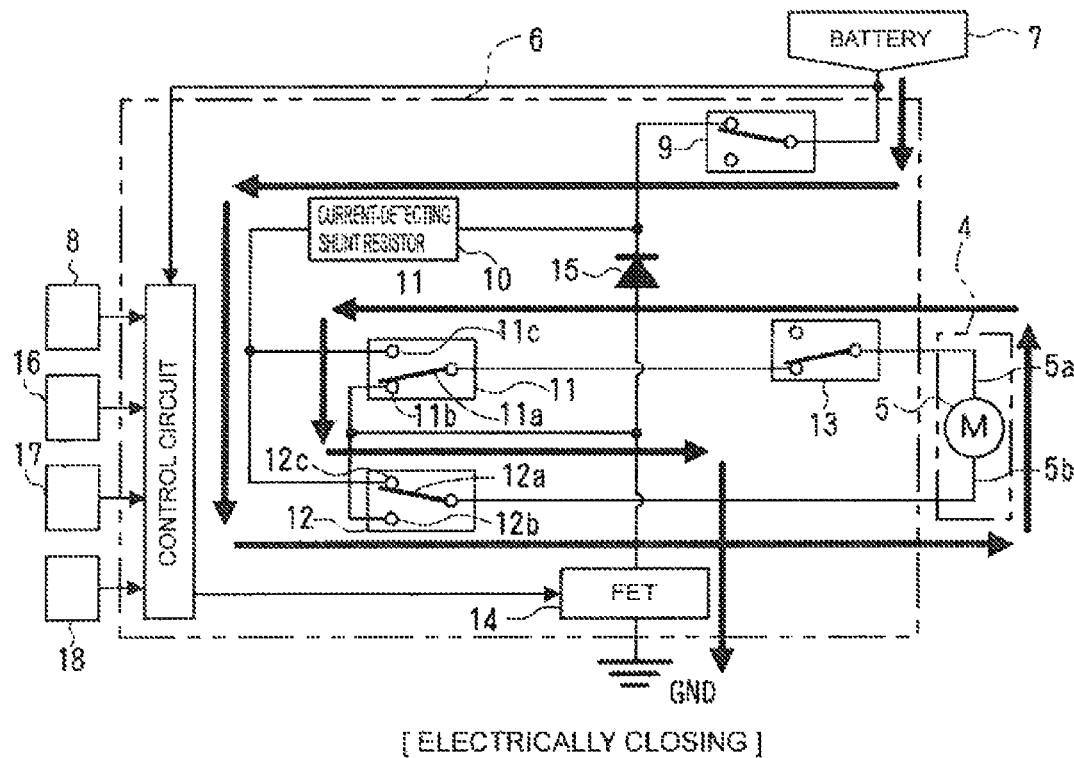
FIG. 4 is a circuit diagram of the control device in electrically-closing operation.

When the liftgate 1 is on the fully-closed position, the control switch 16 is operated to open the liftgate 1, based on the control switch 16 that receives an opening signal, the control unit 6 makes the on/off switch 9 turn on; makes the opening switch 11 turn to the other where the moving contact point 11a is connected to the B contact point 11c; makes the closing switch 12 turn to the other where the moving contact point 12a is connected to the A contact point 12b; and makes the on/off switch 13 turn on in FIG. 3. As shown by solid-line arrows in FIG. 3, the opening drive circuit (on/off switch 9→current-detecting shunt resistor 10→opening switch 11 or B contact point 11c→on/off switch 13→positive supply terminal 5a→motor 5→negative supply terminal 5b→closing switch 12 or A contact point 12b→drive switch 14→GND) turns on. Thus, the liftgate 1 opens from the fully-closed position 1A by normal drive of the motor 3.

Figure 5:
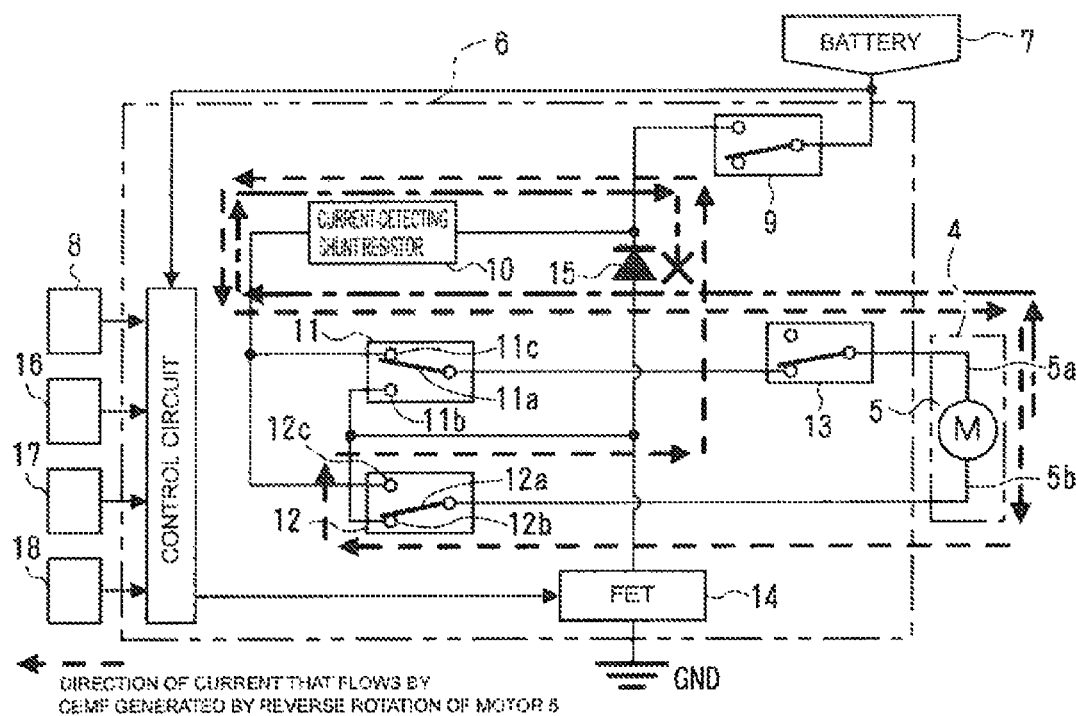
FIG. 5 is a circuit diagram of the control device when a door is within a fully-closed-position-adjacent open range.

While the liftgate 1 opens electrically, the control switch 16 is operated to stop within the fully-closed-position-adjacent open range R1, the control unit 6 turns off the on/off switch 9, turns the opening switch 1 and closing switch 12 to the other, and turns of the on/off switch 13 based on a stopping signal from the control switch 16 in FIG. 5. in the control 5, there is formed a regenerative brake circuit including a diode 15 capable of applying regenerative brake against reverse rotation of the motor 5 by making a short circuit between the supply terminals 5a and 5b of the motor 5.

Specifically, the regenerative brake circuit, which is formed when the liftgate 1 is within the fully-closed-position-adjacent open range, comprises a closed circuit connected in series, motor 5→negative supply terminal 5b→closing switch 12→diode 15 (forward direction)→current-detecting shunt resistor 10→opening switch 12→on/off switch 13→positive supply terminal 5a→motor 5. The diode 15 is disposed in a forward direction with respect to a current direction (as shown by dotted lines in FIG. 5) which flows by counter-electromotive force generated by reverse rotation of the motor in the closing direction to enable the current to flow as shown by the dotted lines in FIG. 5 to make a short circuit in the regenerative brake circuit formed when the liftgate 1 is within the fully-closed-position-adjacent open range R1. The diode 15 is in a reverse direction with respect to a direction (as shown by long dashed short clashed lines opposite the dotted lines in FIG. 5) of current which flows by counter-electromotive force generated by normal rotation of the motor 5 in the opening direction. The diode 15 blocks current flow as shown by the long dashed short dashed lines in FIG. 5 and does not make short circuit the regenerative brake circuit which is formed when the liftgate 1 is within the fully-closed-position-adjacent open range R1. Thus, regenerative braking is generated by the motor 5 against the closing direction of the liftgate 1, but is not generated by the motor 5 against the opening direction of the liftgate 1.

Accordingly, when the liftgate 1 stops within the fully-closed-position-adjacent range R1, for example, even if a force of the gas stay 3 decrease in a cold district, the regenerative brake by the motor 5 can prevent the liftgate 1 from closing by its own weight against the force of the gas stay 3. The regenerative braking is not made by the motor when the liftgate 1 opens thereby enabling the liftgate 1 to be opened manually, if required.

When the liftgate 1 is opened electrically, the liftgate 1 is likely to hit the ceilings of a car park and a garage. In order that the liftgate 1 is stopped right before the fully-open position 1D within the fully-open-position-adjacent range R2, the control switch 16 is operated when the liftgate 1 reaches the stop position.

Figure 6:
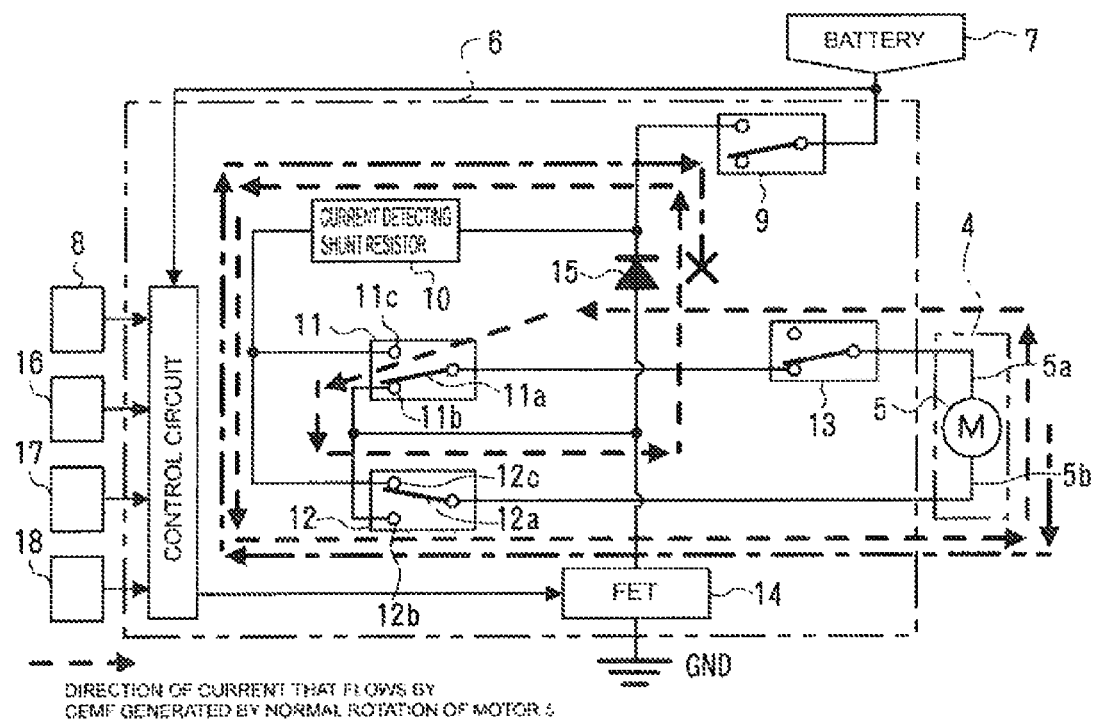
FIG. 6 is a circuit diagram of the control device when the door is within a fully-open-position-adjacent open range.
Figure 7:
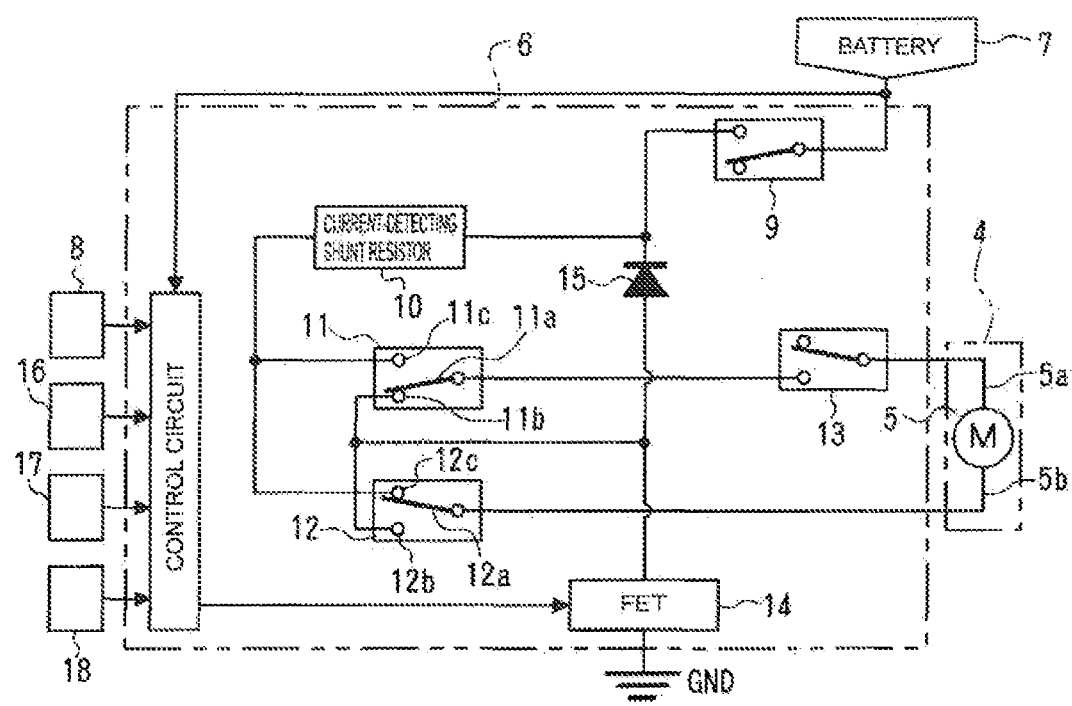
FIG. 7 is a circuit diagram of the control device when the door is within an intermediate open range.

In FIG. 6, based on the stop signal from the control switch 16, the control unit 6 turns off the on/off switch 9; put the opening switch 11 and closing switch 12 into the default state; and turns on the on/off switch 13 in a full-open-position-adjacent switching control. Thus, a regenerative braking circuit that includes the diode 15 which can apply regenerative braking to normal rotation of the motor 5 is formed in the control unit 6 by making a short circuit in an electric circuit between the supply terminals 5a and 5b of the motor 5.

Specifically, the regenerative brake circuit that is formed when the liftgate 1 is within the fully-open-position-adjacent open range R2 comprises a closing circuit connected in series as shown by dotted lines in FIG. 6, motor 5→positive supply terminal 5a→on/off switch 13→opening switch 11→closing switch 12→diode 15 (forward direction)→current-detecting shunt resistor 10→closing switch 12→negative supply terminal 5b→motor 5. The diode 15 is disposed in the forward direction with respect to a direction of an electric current which flows by reverse electro-motive force generated by normal rotation of the motor 5 enabling current to flow as shown by the dotted lines in FIG. 6. A short circuit is made in the regenerative brake circuit which is formed when the liftgate 1 is within the fully-open-position-adjacent open range R2. The diode 15 is disposed in a reverse direction with respect to a current flow (as shown by long dashed short dashed lines opposite the dotted-line arrows) thereby blocking the current flow as shown by the long dashed short dashed lines in FIG. 6 and preventing short circuit in the regenerative brake circuit which is formed when the liftgate 1 is within the fully-open-position-adjacent open range R2. Thus, regenerative braking by the motor 5 is generated when the door 1 opens, but is not generated when the door 1 closes.

Accordingly, when the liftgate is on right before the fully-open position within the fully-open-position-adjacent open range R2, the liftgate 1 can be stopped at a desired position by preventing the liftgate 1 from opening by the regenerative brake in a normal direction of the motor 5 even if a force is applied by the gas stay 3 to make the liftgate 1 open. Regenerative braking is not generated against reverse rotation of the motor 5, and the door 1 can be closed manually, if required.

When the foregoing opening-stop position is stored in advance in the control unit 6, the liftgate 1 can be stopped at the opening-stop position by applying regenerative braking to the normal rotation of the motor 5 by fully-closed-position-adjacent turning control when the liftgate 1 is on the opening-stop position similar to the case where the control switch 16 is operated to stop the liftgate 1.

While the liftgate 1 opens or closes electrically, the control switch 16 is operated to stop the liftgate 1 within the intermediate open range R3. The control unit 6 receives a stopping signal from the control switch 16 and carries out intermediate turning control where the on/off switch 12 is off, the opening switch 11 and closing switch 12 are in default, and the on/off switch 13 is off. Accordingly, when the liftgate 1 is within the intermediate open range R3, the regenerative brake circuit which opens is applied to neither normal rotation nor reverse rotation of the motor 5, so that the liftgate 1 can freely be opened and closed manually, if required.

When the liftgate 1 is open, the control switch 16 is operated to close the liftgate 1. The control unit 6 receives a closing signal from the control switch 16 and carries out "on" state where the on/off switch 9 is on, the opening switch 11 and closing switch 12 are both in default, and on/off switch 13 is on. Accordingly, the closing circuit as shown by solid lines in FIG. 4 becomes on (on/off switch 9→current-detecting shunt resistor 10→closing switch 12→negative supply terminal 5b→motor 5→positive supply terminal 5a→on/off switch 13→opening switch 11→driving switch 14→GND), so that the liftgate 1 is closed by reverse rotation of the motor 5.

From the above, when the liftgate 1 is within the fully-open-position-adjacent range R2, an opening control device for a vehicle door according to the present invention carries out fully-open-position-adjacent turning control in which the device applies regenerative braking to normal rotation of the motor 5 for opening the liftgate 1, but does not apply reverse rotation of the motor 5 for closing the liftgate 1. Thus, if the liftgate 1 is within the fully-open-position-adjacent open range R2, the liftgate 1 can be stopped at a desired position before the liftgate 1 reaches the fully-open positron 1D thereby preventing the liftgate 1 from hitting an obstacle such as the ceiling or wall.

By the simple structure in which the single diode 15 is provided in the regenerative brake circuit, the liftgate 1 can be not only stopped close to the fully-closed position, but also can be closed manually if required, when the liftgate 1 is within the fully-open-position-adjacent open range R2. Furthermore, when the liftgate 1 is within the fully-closed-position-adjacent open range R1, the liftgate 1 can be stopped close to the fully-closed position and can be opened manually, if required, though the force of the gas stay 3 becomes weaker.

One embodiment of the present invention is described, and various modifications and changes below may be made without departing from the scope of claims.

(1) Instead of the liftgate 1, the present invention may be applied to a side door pivotally mounted to a vertical hinge shaft at the side of a vehicle body and a sliding door that opens and closes longitudinally along the vehicle body.

(2) Instead of the mechanical relay, the opening switch 11 and closing switch 12 may be a no-contact-point switch such as FET.

What is claimed is:

1. An opening control device in a liftgate vehicle door that is pivotally mounted at a back of a vehicle body to open and close vertically, and that opens and closes electrically, the device comprising:
   a motor connected to the door so that the door opens and closes;
   a control unit electrically connected to the motor to rotate and stop the motor;
   an electric circuit connected between a first terminal and a second terminal of the motor,
   a control circuit connected to the electric circuit;
   a temperature sensor connected to the control circuit to detect circumferential temperature;
   a vehicle tilt sensor connected to the control circuit to detect an angle of the vehicle; and
   a control switch that orders electric opening/closing of the door,
   wherein the control unit stops power supply to the motor, making a short circuit in the electric circuit thereby producing in the electric circuit a regenerative brake circuit that enables regenerative braking to apply to rotation of the motor,
   wherein, when the door is within a fully-open-position-adjacent open range that is adjacent to a fully-open position of the door, the control unit performs a fully-open-position-adjacent turning control by which the regenerative braking is applied to normal rotation of the motor for opening the motor and is not applied to reverse rotation of the motor for closing the door;
   wherein, when the door is within a fully-open-position-adjacent open range that is adjacent to a fully-open position of the door, the control unit performs fully-open-position-adjacent turning control by which the regenerative braking is applied to normal rotation for opening the motor and is not applied to reverse rotation for closing the door,
   wherein, when the door is within a fully-closed-position-adjacent open range that is adjacent to a fully-closed position of the door, the control unit performs fully-closed-position-adjacent turning control by which the regenerative braking is not applied to the normal rotation for opening the motor and is applied to the reverse rotation of the motor for closing the door,
   wherein the control unit comprises a plurality of switches which are turned to enable the motor to rotate normally based on an opening order of the control switch and to enable the motor to rotate reversely based on a closing order of the control switch, the regenerative brake circuit includes a diode enabling an electric current to pass through only in one direction, and the electric current caused by a counter electromotive force generated by rotation of the motor flows,
   wherein the plurality of switches are turned such that an electric current caused by a counter electromotive force generated by the normal rotation of the motor flows in a forward direction and an electric current caused by a counter electromotive force generated by the reverse rotation of the motor flows in a reverse direction along the diode when the door is within the fully-open-position-adjacent open range by stopping power supply to the motor, and such that an electric current caused by a counter electromotive force generated by the normal rotation of the motor flows in a reverse direction along the diode and an electric current caused by a counter electromotive force generated by the reverse rotation of the motor flows in the forward direction along the diode, wherein, when the door is within an intermediate open range between the fully-closed-position-adjacent open range and the fully-open-position-adjacent open range, the control unit performs intermediate turning control by which the regenerative braking is not applied to the normal rotation or the reverse rotation of the motor, wherein an on/off switch connected to the motor in series in the plurality of switches closes the regenerative brake circuit when the door is within the fully-open-position-adjacent open range or the fully-closed-position-adjacent open range, and the on/off switch opens the regenerative brake circuit when the door is within the intermediate open range; and wherein the control circuit increases the fully-closed-position adjacent open range and the fully-open-position-adjacent open range based on the temperature detected by the temperature sensor and the angle of the vehicle detected by the vehicle-tilt sensor.

2. The opening control device of claim 1, further comprising vehicle-circumstance detecting means, wherein the control unit enlarges the fully-closed-position-adjacent open range in an opening direction.

3. The opening control device of claim 2 wherein the vehicle-circumstance detecting means is a temperature sensor.

4. The opening control device of claim 1 wherein the control unit can measure a door position based on a signal with opening/closing motion of the door and can optionally set an opening stop position within the fully-open-position-adjacent open range, the opening stop position being stored, the control unit performing the fully-open-position-adjacent turning control when the door opens with normal rotation of the motor and reaches the opening stop position.

5. The opening control device of claim 1, further comprising door-opening forcing means by which the liftgate is opened, wherein the control unit enlarges the fully-open-position-adjacent range in a closing direction based on by detected value of the vehicle.

6. The opening control device of claim 1 wherein the door-opening forcing means comprises a gas stay connected between the liftgate and the vehicle body.

* * * * *